(12) United States Patent
Chou et al.

(10) Patent No.: US 8,675,067 B2
(45) Date of Patent: Mar. 18, 2014

(54) IMMERSIVE REMOTE CONFERENCING

(75) Inventors: Philip A. Chou, Bellevue, WA (US);
Zhengyou Zhang, Bellevue, WA (US);
Cha Zhang, Sammamish, WA (US);
Dinei A. Florencio, Redmond, WA (US);
Zicheng Liu, Bellevue, WA (US);
Rajesh K. Hegde, Redmond, WA (US);
Nirupama Chandrasekaran, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 13/100,504

(22) Filed: May 4, 2011

(65) Prior Publication Data
US 2012/0281059 A1 Nov. 8, 2012

(51) Int. Cl.
*H04N 7/18* (2006.01)
(52) U.S. Cl.
USPC .......... 348/143; 348/149; 348/151; 348/14.08; 348/14.16
(58) Field of Classification Search
USPC .................... 348/14.07–14.1; 349/143, 149
See application file for complete search history.

(56) References Cited

U.S. PATENT DOCUMENTS

| | | |
|---|---|---|
| 6,853,398 B2 | 2/2005 | Malzbender et al. |
| 7,092,001 B2 | 8/2006 | Schulz |
| 7,106,358 B2 | 9/2006 | Valliath et al. |
| 7,840,638 B2 | 11/2010 | Zhang et al. |
| 2008/0246836 A1* | 10/2008 | Lowe et al. ............... 348/46 |
| 2009/0051681 A1* | 2/2009 | Sharp et al. .............. 345/419 |
| 2009/0222744 A1 | 9/2009 | Renner |
| 2010/0188478 A1* | 7/2010 | Robinson et al. ......... 348/14.16 |
| 2010/0201785 A1* | 8/2010 | Lantin ..................... 348/46 |
| 2011/0316966 A1* | 12/2011 | Lee et al. ................ 348/14.16 |

OTHER PUBLICATIONS

Toyama, Kentaro, Head Parallax Tracking for Control of a Virtual Space, 1991, pp. 1-6.*
Eisert, Peter, "Immersive 3-D Video Conferencing: Challenges, Concepts, and Implementations", Retrieved at http://www.google.com/url?sa=t&source=web&cd=1&ved=0CBYQFjAA
&url=http%3A%2F%2Fwww.informatik.hu-berlin.
de%2Fforschung%2Fgebiete%2Fviscom%2Fpapers%2Fvcip03.
pdf&rct=j&q=Immersive%203-D%20Video%20Conferencing%
3A%20Challenges%2C%20Concepts%2Cand%20Implementations
&ei=vnhLTcb8McGlhQetxvC6Dg
&usg=AFQjCNGNuTyh9dZQaNzNfpmOLeLalcuXCg
&sig2=ztjwfo Jul. 2003.
Feldmann, et al., "Immersive Multi-User 3D Video Communication", Retrieved at <<http://people.tid.es/oscar.divorra/PublicDocuments/IBC09-HHI-3dp.pdf>>, Sep. 2009, pp. 8.
Kantonen, et al., "Mixed Reality in Virtual World Teleconferencing", Retrieved at <<http://ieeexplore.ieee.org/stamp/stamp.jsp?arnumber=05444792>>, IEEE Virtual Reality, Mar. 20-24, 2010, pp. 179-182.

(Continued)

*Primary Examiner* — Joseph J Nguyen
(74) *Attorney, Agent, or Firm* — Steve Wight; Carole Boelitz; Micky Minhas

(57) ABSTRACT

The subject disclosure is directed towards an immersive conference, in which participants in separate locations are brought together into a common virtual environment (scene), such that they appear to each other to be in a common space, with geometry, appearance, and real-time natural interaction (e.g., gestures) preserved. In one aspect, depth data and video data are processed to place remote participants in the common scene from the first person point of view of a local participant. Sound data may be spatially controlled, and parallax computed to provide a realistic experience. The scene may be augmented with various data, videos and other effects/animations.

19 Claims, 10 Drawing Sheets

(56) References Cited

OTHER PUBLICATIONS

"High Tech: Low Carbon—Section 2: What the technology sector does for other sectors: enhance, enable, transform", Retrieved at <<http://www.intellectuk.org/content/view/3791/84/>>, Retrieved on Feb. 3, 2011, pp. 2.

Schreer, et al., "A Virtual 3D video-conference system providing semi-immersive telepresence: a real time solution in hardware and software", Retrieved at <<http://ip.hhi.de/imedia_G3/assets/pdfs/eBusiness01.pdf>>, Retrieved on Feb. 3, 2011, pp. 7.

* cited by examiner

IMMERSIVE REMOTE CONFERENCING

BACKGROUND

Videoconferencing has become a popular way for people to conduct business, particularly when they are geographically separated. Desktop video conferencing provides an inexpensive way for small businesses and individuals to see each other and associated content (e.g., whiteboards, physical objects and so forth) when they are remotely connected. Another type of videoconferencing allows people to see each other for the purpose of socializing, e.g., using webcams.

However, most current means of telecommunication, including desktop video conferencing, do not provide a way for participants to convey important types of non-verbal social signals (including accurate eye gaze and gesture direction) that are afforded in face-to-face meetings. This results in an unnatural looking experience, as well as in losing possibly valuable non-verbal information that can be conveyed in person. Some high-end room conferencing systems are better at conveying such social signals, but their size and cost make their use very limited.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which depth and video data of remote conference participants are processed to place the conference participants into a common scene. In general, a common scene provides users with the experience that the participants share a common environment, such as in the same room around a conference table; however each user may choose a different virtual environment (e.g., rooms with different physical characteristics such as dimensions, lighting, background walls, floors and so forth) for the common scene that user is viewing.

In one aspect, a service (e.g., of a local user participant) receives video information and depth information corresponding to data captured by camera mechanisms of remote participants. A view generator processes corresponding data to place visible representations of remote participants into the common scene, which may be rendered to the user via a first-person point of view. The scene may be rendered via at least one display, via a holographic screen, or via goggles.

In one aspect, the scene is rendered with photo-realistic representations of the participants, providing a realistic immersive conference experience. A camera mechanism may capture video information and depth information corresponding to the local user participant, so that the other remote participants receive the same immersive conference experience from each of their points of view.

In one aspect, a head (or similar position) tracking mechanism provides user head position data to a view generator, which uses the head position data to compensate for motion parallax in rendering the scene as the user moves. The scene may be rendered differently to each eye of a viewer to provide stereoscopic viewing, at least part of the viewing time. The head tracking/position data may be used by a spatial audio mechanism to adjust spatial audio output based upon the position of the user. The spatial audio mechanism may also control audio output to provide a perceived direction of audio from an audio source in the scene.

In one aspect, the scene may be augmented with two-dimensional data, three-dimensional data, animation, at least one avatar, fake participant, and/or video of another scene. For example, shared data, private data, projected screens, projected documents, three-dimensional representations of data, videos, background surfaces, windows, images, and/or computational surfaces may be rendered in the scene; some may be interactive. Other examples include one or more virtual assistants, speech transcriptions or translations, notes and/or bubbles (e.g., containing text).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having videoconference participants view a conference scene through one or more desktop monitors, with the content displayed on the monitors making the monitors appear as if they are windows onto a common scene, i.e., a single scene or virtual environment that each videoconference participant appears to have in common, into which he or she is embedded. For example, people who are in three or more geographically separate locations are brought together into a common environment, so that they appear to each other to be in a common space, with geometry, appearance, and real-time natural interaction (e.g., gestures) preserved. Note that even though the scene is common, each user may choose to view the common scene in a different virtual environment (e.g., a room with different physical characteristics such as dimensions, lighting, background walls, floors and so forth) according to that user's preferences and/or own captured physical environment.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and communications in general.

Figure 1A:
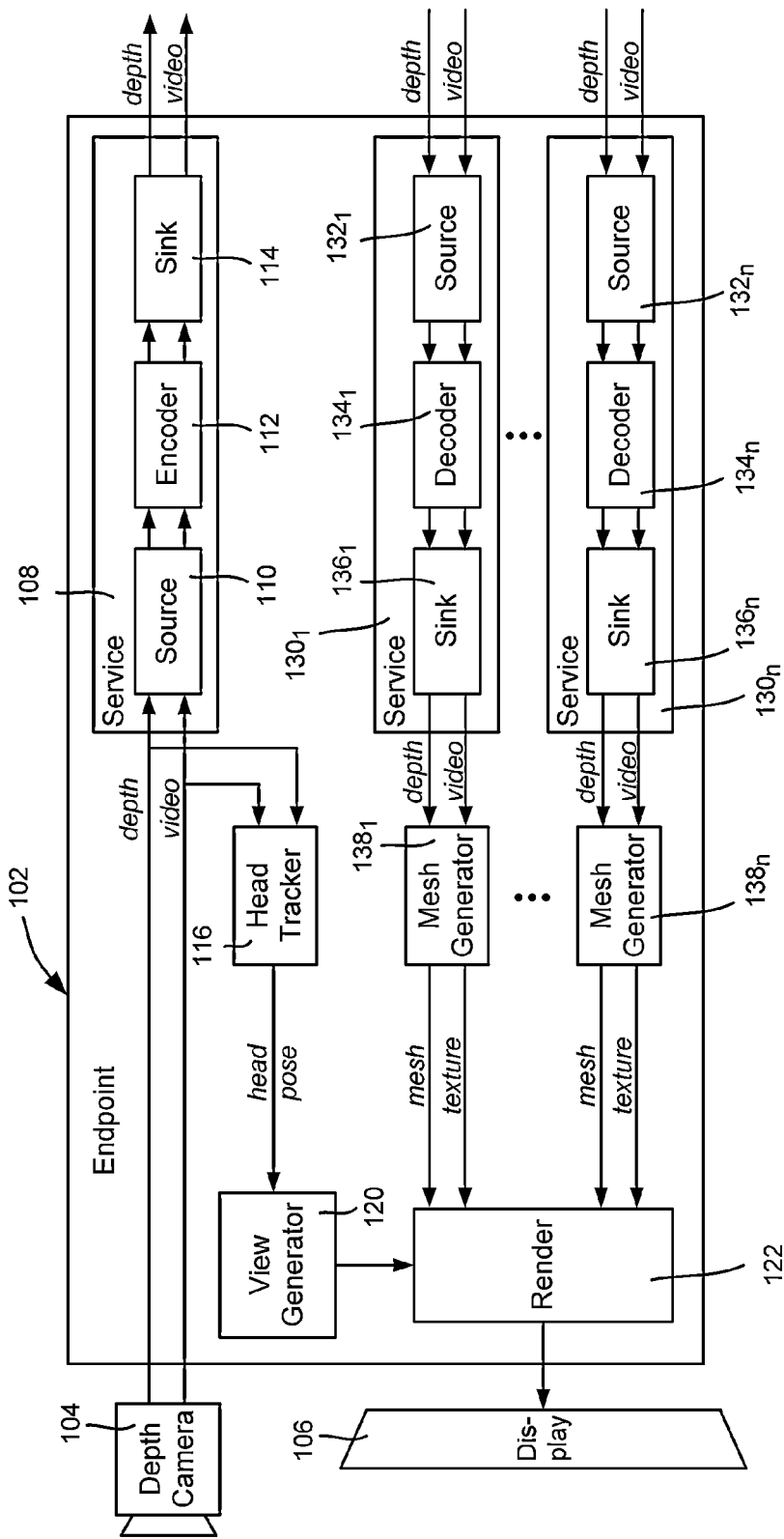
FIG. 1A is a block diagram representing example components for capturing video and depth data and for processing captured video and depth data to place visible representations of conference participants into a common scene for viewing by a user.

FIG. 1A shows example components for providing a conference experience that simulates an actual in-person environment to a user (conference participant or group of users at the same physical location). As can be readily appreciated, each user has a like or similar set of components at his or her respective location, e.g., generally implemented in a personal computing environment configured as an endpoint 102 coupled to a depth camera 104 and display 106. An example display is a large widescreen, high-definition monitor or the like, however any suitable display may be used.

The camera 104 may be part of a camera mechanism comprising one or more cameras that may move, provide for stereoscopic capture, and/or provide depth data or RGB data, or both (whether from the same camera set or different camera sets). For purposes of brevity herein, only one depth camera 104 is shown in FIG. 1A, however it is understood that the camera mechanism may be any combination of depth and RGB capturing technology (or the like), using at least one camera.

In general, the depth camera 104 is mounted near the user's display, and captures frames of images and depth information about a user. Each frame may be represented by an array of pixels, each with an R, G, B (or similar color scheme) and D (depth) value. The depth and video is processed by a service 108 for transmission, as represented by the source 110 for the captured content being encoded (via any suitable encoder 112) into the sink 114 for transmission, e.g., over an internet connection or other network (e.g., intranet) connection. Although not explicitly shown in FIG. 1A, it is understood that audio is typically captured, encoded and sent as well.

The user's depth and video information may be processed locally, such as by a mesh generator into mesh and texture information, e.g., in a known manner to display the local capture in a mirror window to give feedback to the participant as to what he or she looks like to the remote user. A head tracking mechanism 118 processes the information into head tracking data, which a view generator 120 uses to determine how to render a view to the user, as if the user was looking through an actual window. The use of head tracking for providing spatial cues is described below.

The scene that the user will view is based on the video and depth information received from other locations (e.g., one per other participant), as represented by the services $130_1$-$130_n$, each having a corresponding source, decoder and sink, as shown by blocks $132_1$-$132_n$, $134_1$-$134_n$, and $136_1$-$136_n$, where n is any practical number of other user locations. The depth and video decoded and output by each service may be fed to a respective mesh generator $138_1$-$138_n$ where it may be output as mesh and texture data for rendering; (an alternative is to render as a point cloud or some other form). The scene may be life-sized or close to life-sized, in high definition.

Figure 1B:
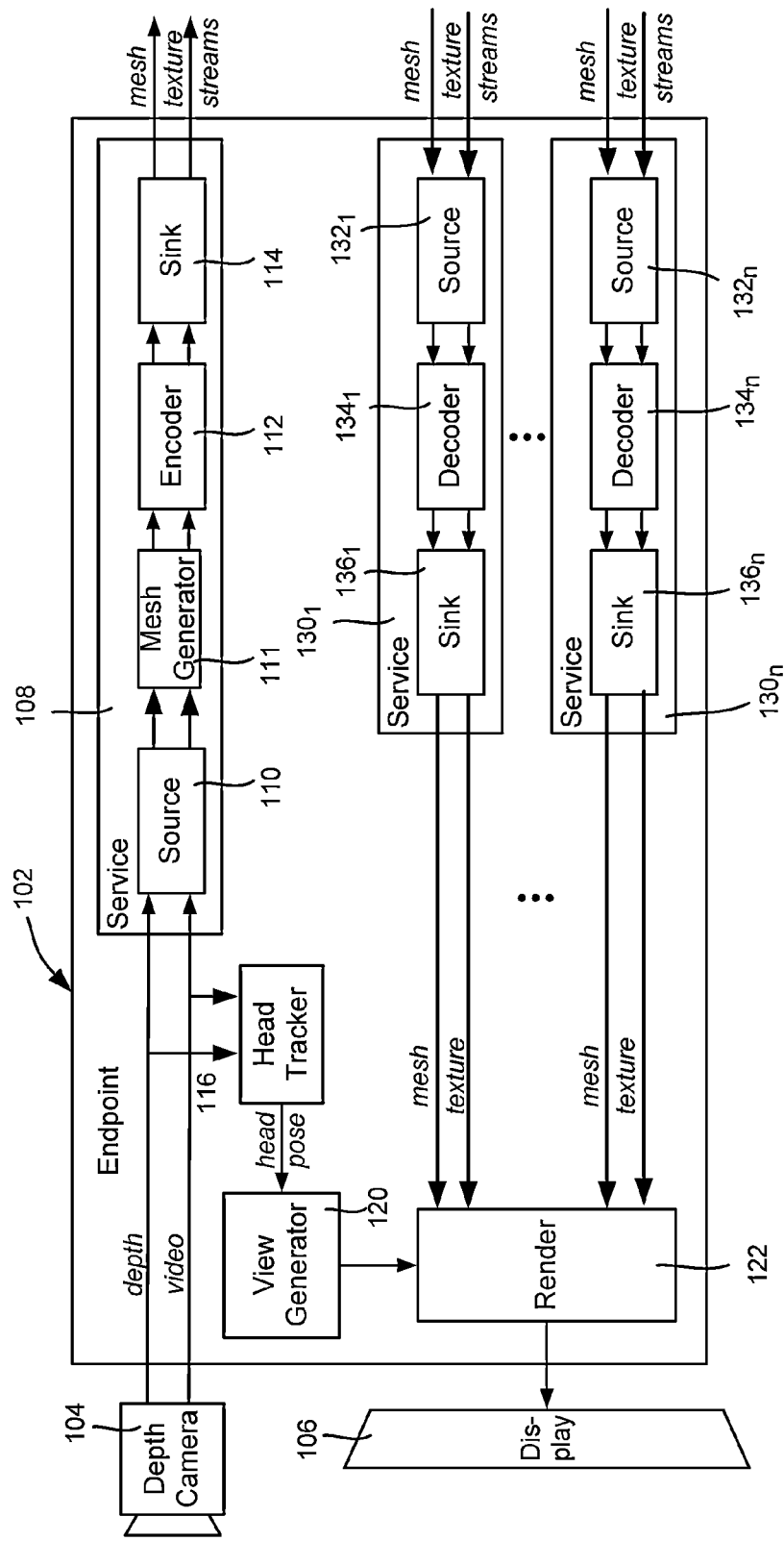
FIG. 1B is a block diagram representing example components in an alternative implementation for capturing video and depth data and for processing captured video and depth data to place visible representations of conference participants into a common scene for viewing by a user.

FIG. 1B is an alternative example block diagram that is generally similar to FIG. 1A, except that a mesh generator 111 is present in the service 108, whereby 3D representation streams (e.g., exemplified as mesh and texture streams) are encoded and output to other participants instead of depth and video data. Such 3D representation streams are likewise input from the data captured for remote participants, eliminating the need for local mesh generator processing of the input streams. As can be readily appreciated, moving the mesh generator after the decoder as in FIG. 1A saves bandwidth, whereas placing the mesh generator before the encoder as in FIG. 1B saves computation, and thus a given implementation may be used based upon such considerations.

Although not explicitly shown in FIGS. 1A and 1B, it is understood that audio is typically received, decoded and output (e.g., to speakers) as well. The audio may be mixed and directionally steered to match the angle of the audio source, e.g., the person speaking, as described below.

Figure 2:
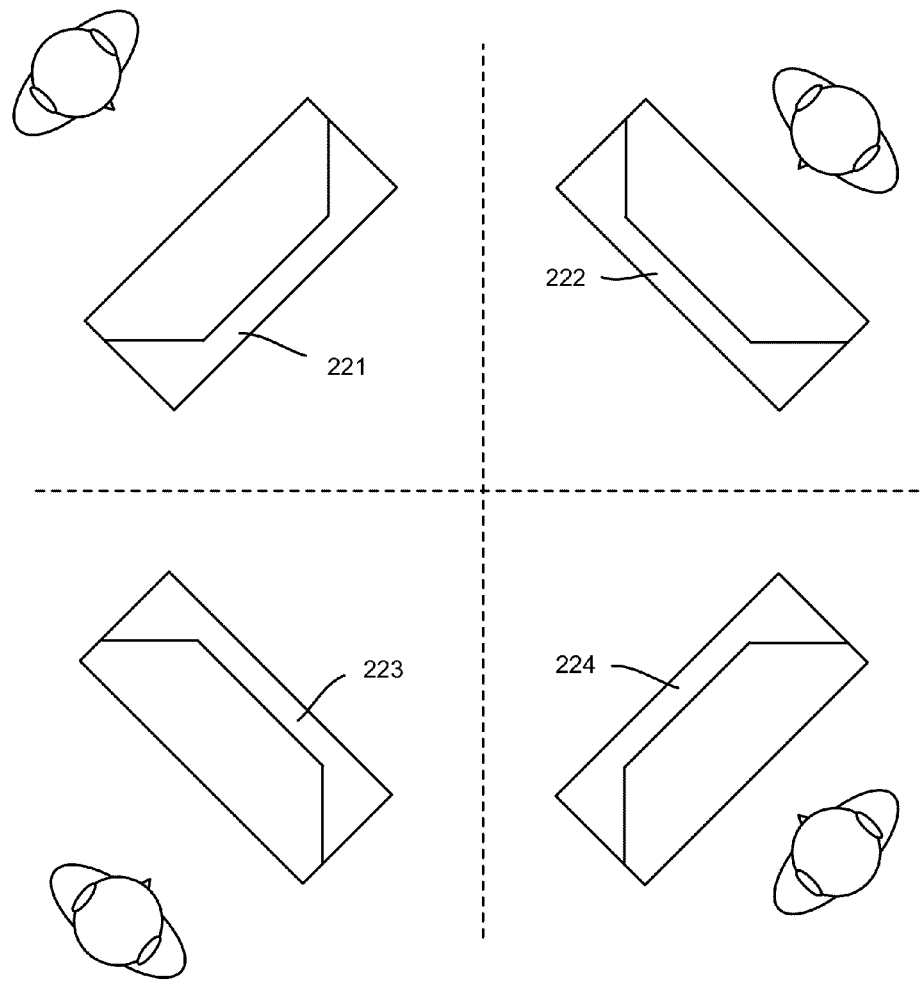
FIG. 2 is an example representation of users at different locations remote from one another, each participating in an immersive video conference.
Figure 3:
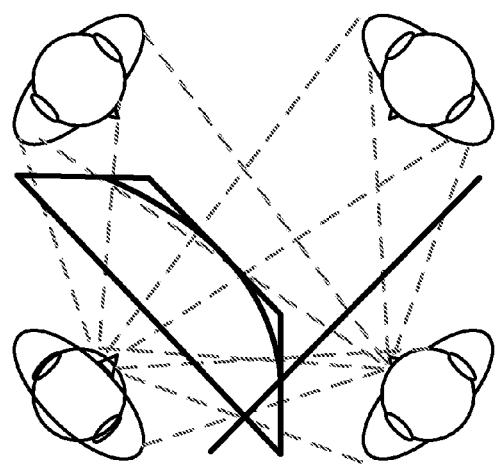
FIGS. 3 and 4 are representations of conference participants participating in an immersive conference from their various perspectives and viewing angles.
Figure 4:
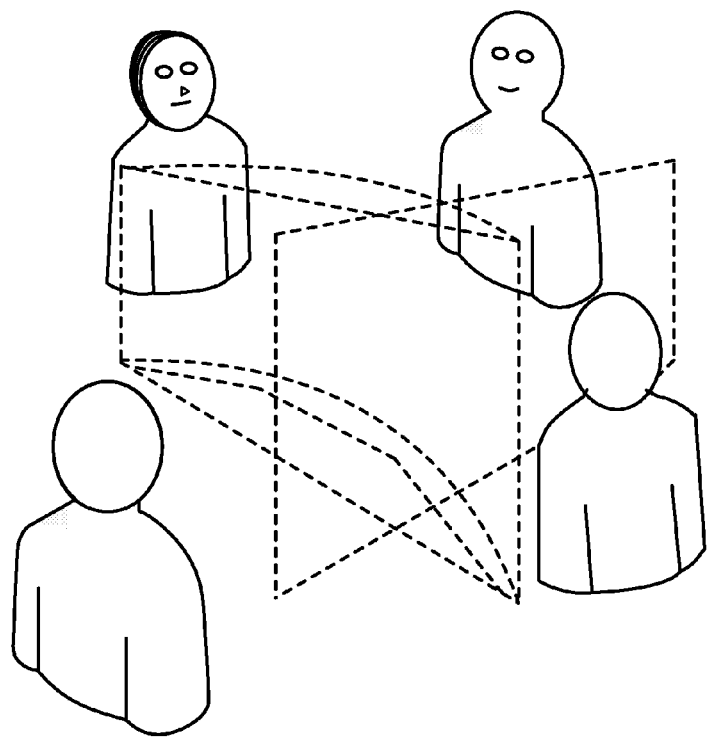

In an exemplary embodiment, each participant joins a meeting from the desk 221-224 in his or her office, as generally represented in FIG. 2. Camera geometry and other related information (e.g., zoom) may be provided as part of the data communicated among the participants, so that angles and size normalization may be performed such that each participant sees each other participant at an appropriate angle and distance, as shown in FIGS. 3 and 4. Lighting adjustments may be made to compensate for different conditions at each remote location.

Figure 5:
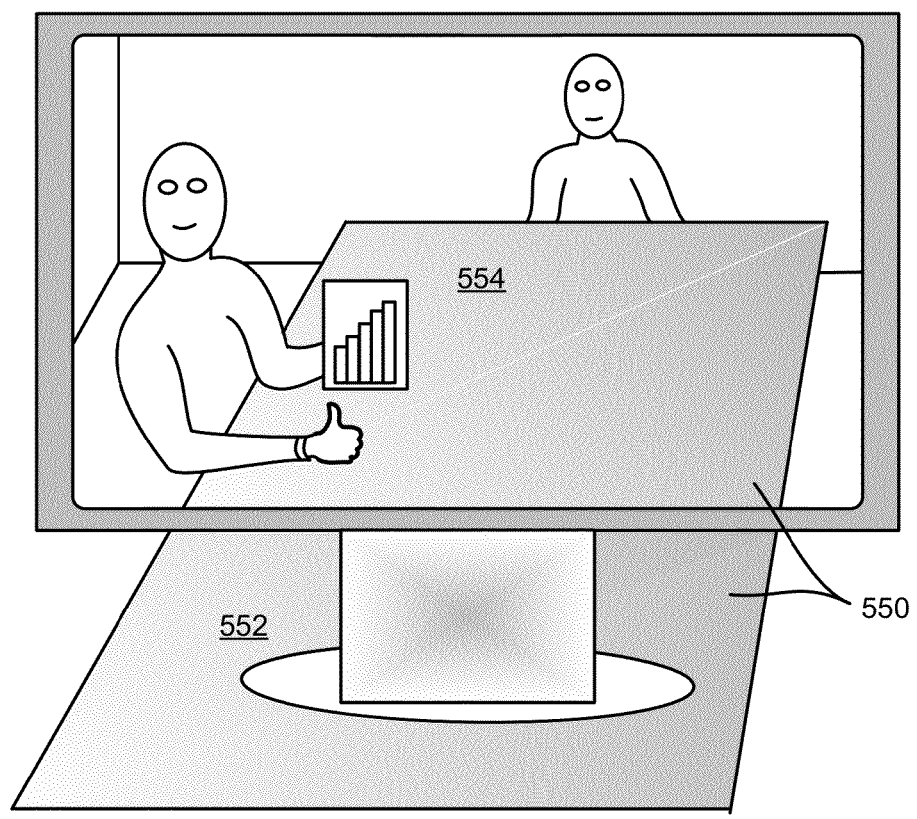
FIG. 5 is a representation of an immersive conference from a first-person point of view of a user participant, including a virtual desk/table extending from the actual desk/table of a user.

In one implementation, the view is computed and rendered such that participants appear to be seated around a common object, e.g., a table 550, as generally represented in FIG. 5. Participants may move and be rendered in a corresponding position, such as within bounding limits so as to not block the view of another participant. Instead of or in addition to a desk or table, another type of virtual object such as a virtual floor or other surface may be rendered, for example. In general, the geometry of participants' seating is arranged, synthesized and/or maintained to provide the right gaze awareness.

The common table 550 may be rendered so as to appear to each participant to be an edge-aligned extension of his or her own desk 552. For example, a user with a light-colored wood desk will see the other participants seated around a light-colored table, whereas a user in the same conference with a dark-colored wood desk will see the other participants seated around a dark-colored table. To this end, the texture data of the local user's desk is substituted for the other participant's desk texture data, and/or artificially simulated via mesh and texture data as needed to create the displayed portion of the table 554. A common room with background walls and ceiling may similarly be mapped and/or simulated.

Each participant thus views the scene through the display (or displays) on the desktop, as if they are a window onto the common scene. While viewing, various spatial cues may be used to make the immersive (e.g., tele and video) conference more realistic. For example, a stereoscopic display may be used to show different views to each eye. Further, using motion parallax, the view displayed on a participant's display monitor may be shifted to reflect that participant's shifting viewpoint relative to the scene as the user's head moves. To enable such effects, the participant's head is tracked by the depth camera 104 and the head track mechanism 118.

Figure 6:
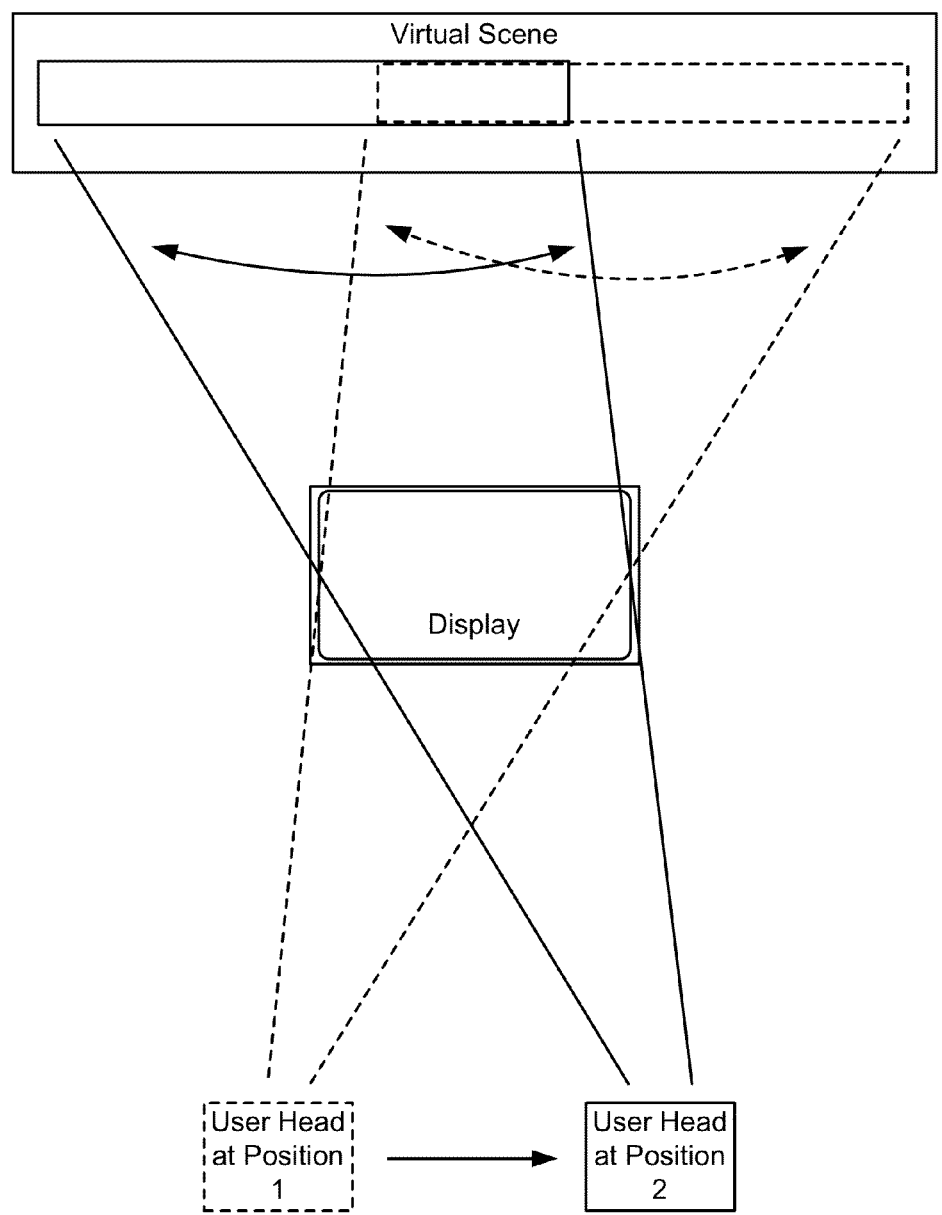
FIG. 6 is a representation of re-rendering of a scene to compensate for parallax as a user moves and changes viewing angles relative to the rendered scene.

For example, as generally represented in FIG. 6, if a user moves to the right, (from head position 1 to head position 2), when the user looks at the display 102, the user's view is computed by the view generator 120 such that when rendered (block 122), the user sees more of the left virtual scene (between the solid lines) and less of the right virtual scene (between the dashed lines), as if looking through a window.

Likewise, the stereo signal emanating from the loudspeakers (or headphones) may be adjusted to reflect this changed listening position. Spatial audio, using either loudspeakers or headphones, is well known in the art, and may be used to have the various participants' speech seem to come from the appropriate locations. One recent spatial audio mechanism uses a visual head-tracking mechanism to modify the audio coming from loudspeakers depending on the listener's position. A single-channel microphone is sufficient in most cases to capture audio from each participant.

In this manner, each participant looks and sounds to the other participants as if they are in the proper spatial locations around the table (e.g., as if they were in the same physical room). By moving his or her head, a participant can see and hear the other participants, and various objects in the room, from different points of view.

Furthermore, a participant may choose to render his or her own image (as seen by others) as one of the participants in the meeting. This is a natural way of providing a mirror (self) image, (in contrast to viewing a self-image on a small-sized window as is conventionally done during tele-conferencing).

In order to render views of the participants from such different points of view, views of the participants are captured from different points of view, and/or view synthesis may be used. One way to do this is to use multiple cameras, and to use the nearest camera view. Another way is to interpolate multiple camera views to get the needed intermediate points of view. Still another way is to use a depth camera to capture the geometry and texture of a participant and to render this texture-mapped geometry from the desired points of view. Combinations of these are also possible for synthesizing new views. Variations of synthetic view synthesis are known in the art. Another alternative in such an immersion context is a "2.5D" representation, in which views of the remote participants are rendered in 2D layers, giving an illusion of three dimensions while avoiding the visual quality degradation inherent in other forms of view interpolation. However, this may result in some additional gaze error depending on the camera density. Any of these variations uses one or more video cameras to capture each participant.

In another exemplary embodiment, stereo goggles and headphones may be used to convey the experience to the wearer. The user's head position may be tracked using sensors such as an accelerometer, compass, and gyroscope, so that the audiovisual scene can be locked to the user's head, to the user's external environment, or to a combination of these, possibly as directed by the user. Images of the user's upper face in various profiles may be captured before putting on the goggles and headphones, whereby the other participants can use the mesh and texture information from those images to see a representation of the user without seeing the goggles and headphones.

Figure 7:
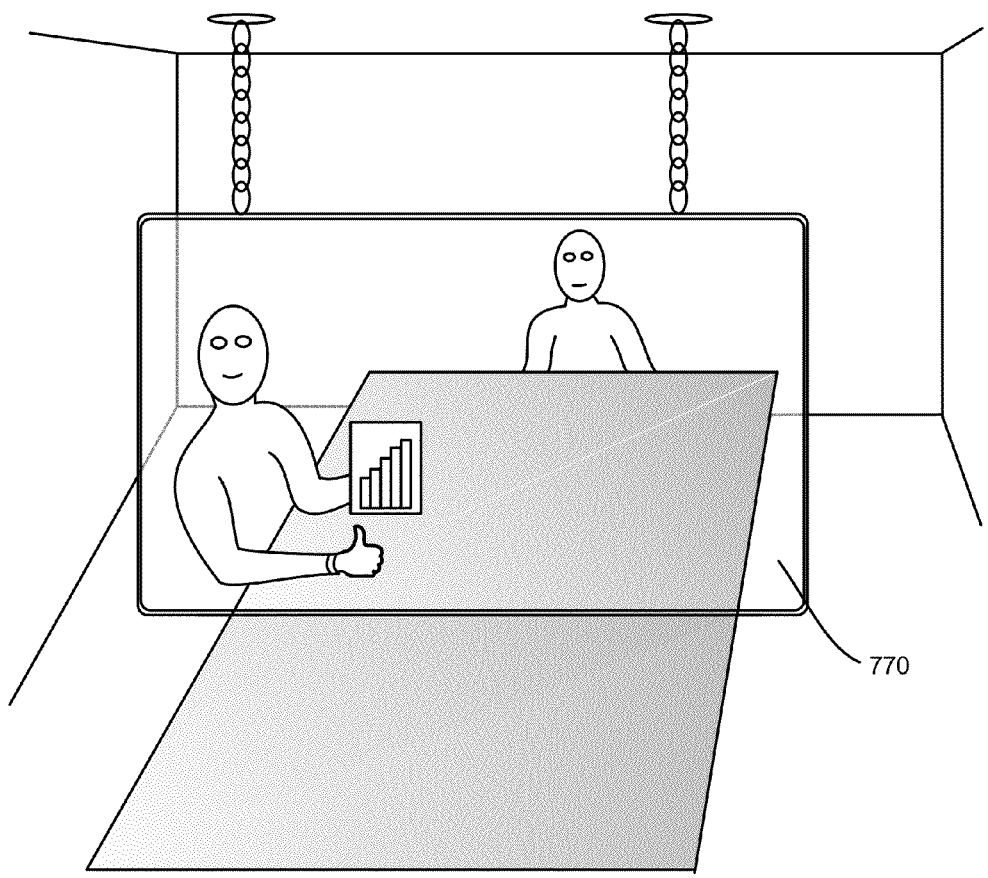
FIG. 7 is a representation of an immersive conference as viewed on a transparent holographic screen.

In another exemplary embodiment generally represented in FIG. 7, a remote participant may be have captured data projected onto a clear holographic screen 770 such that the remote participant appears to be superimposed on the local environment, with the actual local background seen through the screen 770 (unless also superimposed with information). In this way, each remote participant appears to be standing on the other side of a glass wall on the local participant's own physical room. Note that the table appears and is shown in FIG. 7, but may not be present in an alternative implementation.

Figure 8:
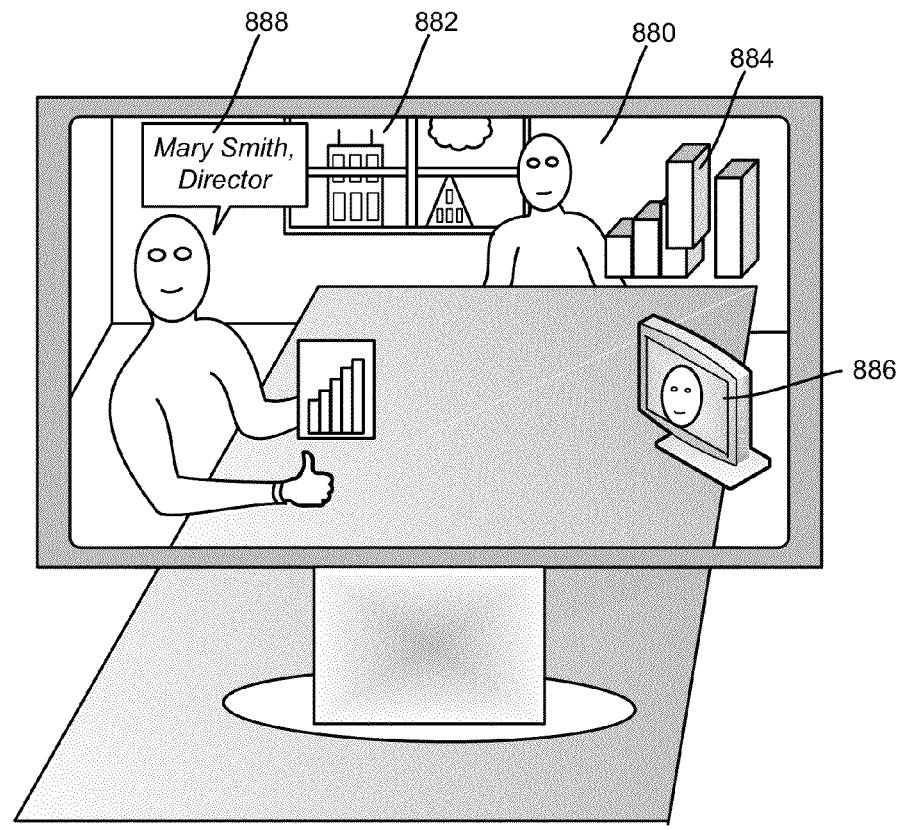
FIG. 8 is a representation of an immersive conference augmented with various data and video.

In one aspect, the views of the other participants can be enhanced with various game-like elements, video, supernatural enhancements, special effects and/or animations, as generally represented in FIG. 8. For example, the table may grow and shrink based upon one or more criteria, e.g., the number of participants, and/or the view may be computationally generated such that participants "slide" around the table as other participants join and/or leave.

A background such as a wall 880 may include what appears to be a "window" 882 that actually shows the view of a live camera out onto a scene, such as the scene from the top floor of a skyscraper. A background wall may show texture, color, lighting and so on, and/or contain active artwork that is selected and/or changes, e.g., in color or theme, such as to reflect the mood of the meeting. A background wall may be an active computational surface, with which a participant can interact using a mouse, stylus or other such device. Overhead screens may show shared data such as a slide of a presentation program, or other documents.

Models of three dimensional data 884 may appear to float mid-air above the table, and can be manipulated by the participants. Other gadgets in the room may show status, such as the time, or the agenda.

Virtual assistants may appear as avatars, possibly seated around the table along with other participants. Virtual assistants may be autonomous, and may provide, for example, unbiased floor control, or other secretarial tasks, or may be controlled by one or more parties. For example, a user may control virtual assistants (which in this case appear as virtual participants who are fake) to provide the appearance of a bigger team. Remote participants not captured by multiple or depth cameras may appear as avatars themselves, using a non-parametric representation of the geometry, or a mixed parametric/non-parametric representation (e.g., an avatar with an actual image of the participant's face). A participant without captured geometry may be shown as a flat, oriented surface, e.g., as a computer monitor 886, as an avatar, or as a robotic proxy. Private or other data may be visible to only the local participant. For example, a bubble 888 may appear over a remote participant's head to show his or her name, position in the organization, and/or other background material. Alternatively, such bubbles may show a transcription and/or translation of the participant's speech.

There is thus described a multi-way, immersive conference, that places multiple remote participants in a common scene. The scene is rendered for each participant from a first-person point of view, with each participant's representation reflecting that participant's body position. Participants are generally rendered photo-realistically (but can be generated in other ways as needed or desired, e.g., as an avatar or a hybrid photo-realistic and avatar representation).

By capturing and communicating appropriate data, e.g., using a depth camera, geometrical relationships are preserved, whereby a display or the like acts as a viewport onto a common scene. By determining a participant's point of view using a vision-based head tracker (or possibly a head-mounted tracker), different views for each eye providing stereoscopy, and/or parallax compensation may be desirably performed.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 9:
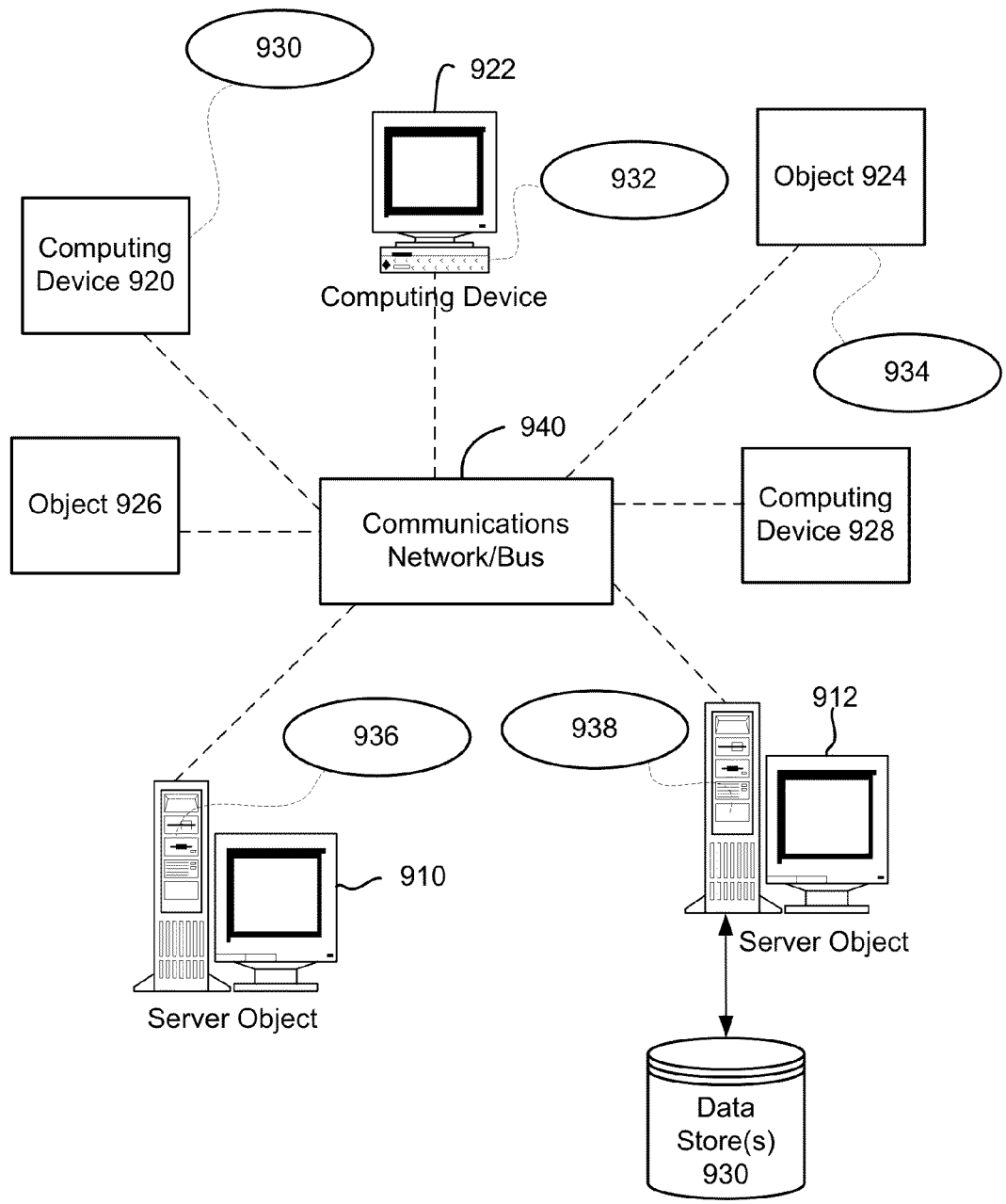
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc., and computing objects or devices 920, 922, 924, 926, 928, etc., which may include programs, methods, data stores, programmable logic, etc. as represented by example applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 10 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
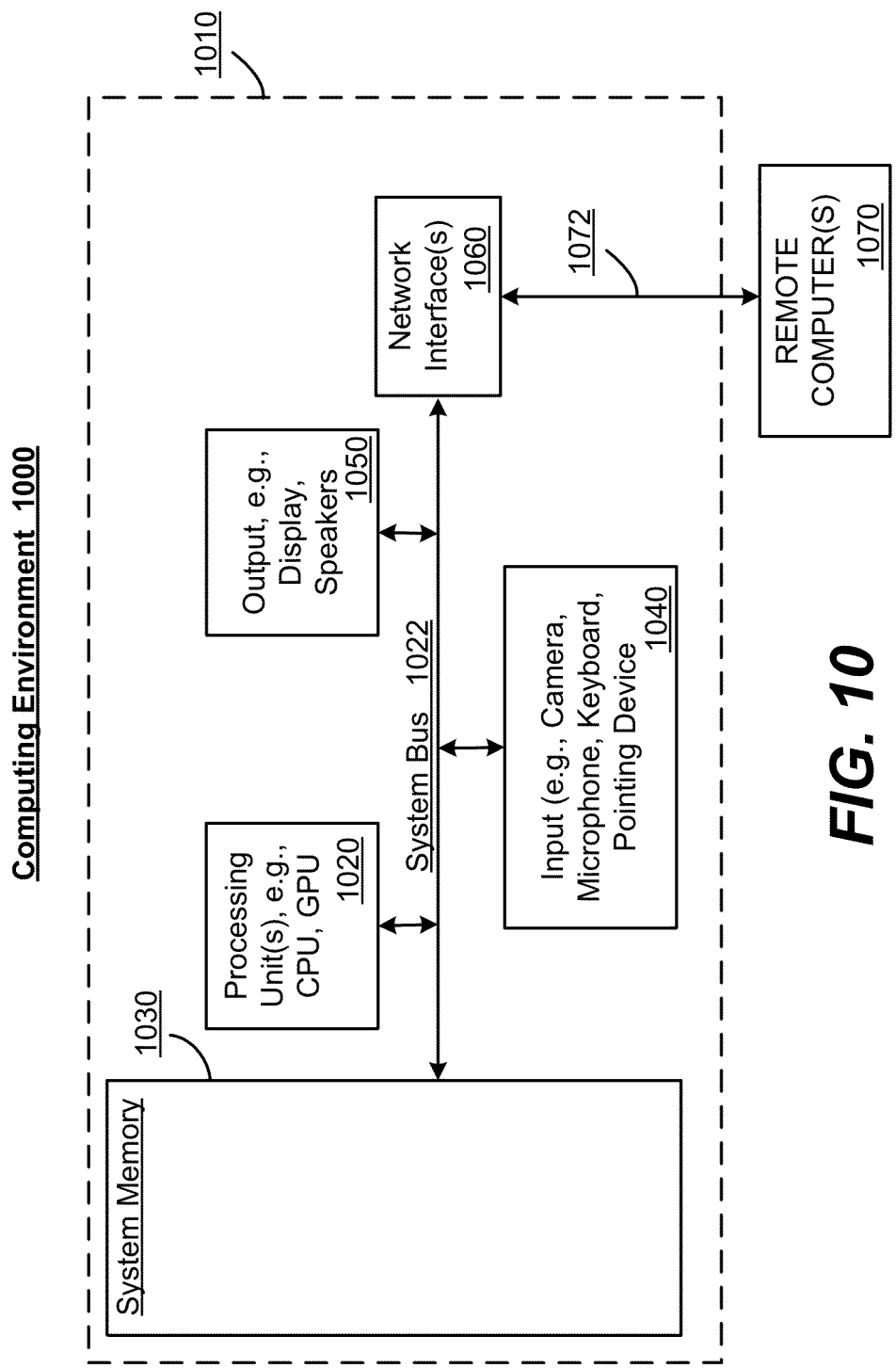
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data.

A user can enter commands and information into the computer 1010 through input devices 1040, including a camera, microphone, keyboard, mouse and the like. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system comprising:
a service configured to receive video information and depth information corresponding to data captured by camera mechanisms of remote participants;
a view generator coupled to the service, the view generator configured to process data corresponding to the video information and depth information to place visible representations of remote participants into a common scene, wherein the common scene is rendered via a first person point of view;
a tracker using position tracking data to re-render the common scene to compensate for parallax as a user viewing the scene moves among different viewing angles; and
an audio output controller to provide spatial audio based upon the position of the user, or based upon a position of a visible representation of a remote participant placed in the common scene, or both.

2. The system of claim 1 wherein the common scene comprises a plurality of common scene renderings with each common scene rendering being visible to a distinct remote participant, and wherein the common scene rendering viewed by at least one participant is augmented or modified with at least one element that is not visible to all participants.

3. The system of claim 1 further comprising a camera mechanism configured to capture video information and depth information corresponding to a local user participant, and to provide data corresponding to the video information and depth information to the remote participants.

4. The system of claim 1 further comprising a mesh generator configured to process the video data of a participant into mesh and texture data.

5. The system of claim 1 further comprising a head tracking mechanism configured to provide user head position data to the view generator, the view generator using the head position data to compensate for motion parallax in rendering the scene as the user moves.

6. The system of claim 1 wherein the scene is rendered via at least one display, via a holographic screen, or via goggles, or wherein the scene is rendered differently to each eye of a viewer to provide stereoscopic viewing at least part of a viewing time, or wherein the scene is rendered via at least one display, via a holographic screen, or via goggles and the scene is rendered differently to each eye of a viewer to provide stereoscopic viewing at least part of a viewing time.

7. The system of claim 1 wherein the view generator generates the common scene with a virtual object, or generates the virtual scene with lighting adjustment of the video data captured by the camera mechanism of at least one remote participant, or both generates the common scene with a virtual object and generates the virtual scene with lighting adjustment of the video data captured by the camera mechanism of at least one remote participant.

8. The system of claim 1 wherein the view generator generates the common scene with a virtual surface and wherein the virtual surface is textured or edge-aligned with an actual surface associated with the user, or both textured and edge-aligned with an actual surface associated with the user.

9. The system of claim 1 further comprising a spatial audio mechanism configured to control audio output to at least two speakers to provide a perceived direction of audio.

10. The system of claim 1 further comprising a tracking mechanism configured to provide user position data, and a spatial audio mechanism configured to use the user position data to adjust spatial audio output based upon the position of the user.

11. The system of claim 1 further comprising a mechanism configured to augment the scene with one or more representations of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble, or any combination of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble.

12. In a computing environment, a method performed at least in part on at least one processor, comprising:
receiving a plurality of sets of data, each set of data corresponding to video and depth data associated with a remote participant;
generating a photo-realistic representation of each remote participant based upon the video and depth data associated with that remote participant;
rendering a common scene via a first-person point of view with the photo-realistic representations of the remote participants placed into the common scene;
using position tracking data to re-render the common scene to compensate for parallax as a user viewing the scene moves among different viewing angles; and
controlling audio output to provide spatial audio based upon the position of the user, or based upon a position of a visible representation of a remote participant placed in the common scene, or both.

13. The method of claim 12 further comprising:
generating a virtual object in the common scene, and adjusting the virtual object's size depending on one or more criteria.

14. The method of claim 13 further comprising:
repositioning at least one participant relative to the virtual object when another participant joins or leaves by having a representation added to or removed from the common scene, respectively.

15. The method of claim 12 further comprising:
generating a representation of a local participant based upon the video-related data associated with that local participant, and wherein rendering the common scene comprises including the representation of the local participant in the common scene viewed by that local participant.

16. The method of claim 12 further comprising:
rendering the scene to compensate for parallax as a viewer of the scene moves among different viewing angles; and
controlling audio output to provide spatial audio based upon a position of a listener, or based upon a position of a visible representation of a remote participant placed in the common scene, or both based upon a position of a listener and based upon a position of a visible representation of a remote participant placed in the common scene.

17. The method of claim 12 further comprising:
augmenting the scene with one or more representations of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble, or any combination of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble.

18. One or more computer-readable media having computer-executable instructions, which when executed perform steps, comprising:

receiving a plurality of sets of data, each set of data corresponding to video and depth data associated with a remote participant;

generating a photo-realistic representation of each participant based upon the video and depth data associated with that remote participant;

rendering a common scene via a first-person point of view with the photo-realistic representations of the remote participants placed in the common scene;

using position tracking data to re-render the common scene to compensate for parallax as a user viewing the scene moves among different viewing angles; and controlling audio output to provide spatial audio based upon the position of the user, or based upon a position of a visible representation of a remote participant placed in the common scene, or both.

19. The one or more computer-readable media of claim 18 having further computer-executable instructions, comprising:

augmenting the scene with one or more representations of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble, or any combination of shared data, private data, a projected screen, a projected document, a three-dimensional representation of data, a video, a background surface, a window, an image, or a computational surface, a representation of a virtual assistant, a representation of a fake participant, a speech transcription, a speech translation, a note or a bubble.

* * * * *